US010733659B2

(12) United States Patent
Haque et al.

(10) Patent No.: US 10,733,659 B2
(45) Date of Patent: Aug. 4, 2020

(54) INTERMEDIARY SERVER TO FACILITATE RESTRICTIVE WEBSITES

(71) Applicant: Visa International Service Association, San Francisco, CA (US)

(72) Inventors: Zeeshanul Haque, Kolkata (IN); Abhishek Bansal, Jaipur (IN)

(73) Assignee: Visa International Service Association, San Francisco, CA (US)

( * ) Notice: Subject to any disclaimer, the term of this patent is extended or adjusted under 35 U.S.C. 154(b) by 618 days.

(21) Appl. No.: 15/232,430

(22) Filed: Aug. 9, 2016

(65) Prior Publication Data

US 2018/0047087 A1 Feb. 15, 2018

(51) Int. Cl.
*G06Q 30/00* (2012.01)
*G06Q 30/06* (2012.01)
*H04L 29/08* (2006.01)

(52) U.S. Cl.
CPC ......... *G06Q 30/0635* (2013.01); *H04L 67/02* (2013.01); *H04L 67/2814* (2013.01)

(58) Field of Classification Search
CPC ................................................ G06Q 30/0635
See application file for complete search history.

(56) References Cited

U.S. PATENT DOCUMENTS

| 2002/0007322 | A1 | 1/2002 | Stromberg |
| 2010/0250397 | A1 | 9/2010 | Ippolito |
| 2011/0161201 | A1* | 6/2011 | Stocker .................. G06Q 20/12 705/27.1 |
| 2013/0290149 | A1 | 10/2013 | Rashwan |

(Continued)

FOREIGN PATENT DOCUMENTS

| JP | 2010-020585 A | 1/2010 |
| KR | 10-0707724 B1 | 4/2007 |

OTHER PUBLICATIONS

Authorize.net announces simple checkout: Allows easy creation of 'buy now' and 'donate' buttons for merchant web sites. (Apr. 15, 2008). PR Newswire Retrieved from https://search.proquest.com/docview/450805990?accountid=14753.*

(Continued)

*Primary Examiner* — Kathleen Palavecino
(74) *Attorney, Agent, or Firm* — Kilpatrick, Townsend & Stockton LLP

(57) ABSTRACT

Embodiments of the present invention are directed to systems and methods for generating, receiving and processing product-specific network addresses that may be used to generate product-specific checkout pages. In some embodiments, an intermediary server is provided that generates product-specific network addresses for merchants to be used on media websites. The product-specific network address is stored by the intermediary server in association with particular product information. The intermediary server acts as an interface between a user that visits the product-specific network address and a host checkout server. Specifically, the intermediary server receives the product-specific network address, retrieves the associated product information, and forwards the product information to the host checkout server. The host checkout server may then generate a checkout page for the user using the product information.

21 Claims, 8 Drawing Sheets

(56) References Cited

U.S. PATENT DOCUMENTS

2013/0290203 A1 10/2013 Purves
2015/0379615 A1 12/2015 Dhar

OTHER PUBLICATIONS

International Search Report and Written Opinion, dated Oct. 17, 2017, in PCT Application No. PCT/US2017/045919, 12 pages.
EP17840148.5 , "Extended European Search Report", dated Jun. 18, 2019, 8 pages.

\* cited by examiner

INTERMEDIARY SERVER TO FACILITATE RESTRICTIVE WEBSITES

BACKGROUND

Conventional websites, such as Authorize.net™, provide services to small merchants (e.g., a restaurant) that do not have full service websites that would allow customers to add items to a shopping cart and provide payment information on a checkout page. These conventional websites allow merchants to create a checkout button as an HTML element that includes product information. The checkout button is linked to a single checkout page (i.e., single URL for all products), and the product information is used to populate fields of the checkout page. In this manner, the merchant does not need to display product information for the user to add to a checkout page, but simply adds specific product information to the checkout button.

However, there is no direct, easy way for merchants to sell individual products on social media platforms (e.g., blogs, Facebook™, Twitter™, etc.) or other websites that have software controls that preclude adding product information to a button. Although conventional websites allow users to create checkout buttons, both the creation and publication of the buttons is complicated in that the merchant must log on to a dedicated website and create an HTML form element. The button can then only be published on websites that allow the merchant to post HTML form elements that send information (e.g., product information) to a host server.

Most social media platforms do not allow merchants to post such HTML form elements, primarily because they can send additional information that is invisible to the user to an external server when a link is clicked. Thus, a merchant cannot add the same checkout button used for their own website to a comment or post on a social media website. A merchant may want to do so when a comment or post refers to a product sold by the merchant. In this manner, the merchant would be able to allow a customer to easily purchase the item using a link in a comment or post.

In addition, integrating a checkout button into social media platforms presents a number of technical difficulties. For example, many social media platforms validate the authenticity of any links before allowing them to be posted. Further, many social media platforms need to generate and post accurate summaries of posted links from information provided on the linked website.

SUMMARY

Thus, there is a need for new and enhanced systems and methods of generating product-specific checkout buttons that integrate seamlessly into social media websites. Embodiments of the invention can address these and other problems, individually and collectively.

One embodiment of the invention is directed to a method comprising receiving, by a server computer system from a first user device, a first request message at a first network address, the first request message requesting a first checkout page that includes first product information of a first product. The method further comprises retrieving, by the server computer system, the first product information from a database that associates the first product information with the first network address. The method further comprises redirecting, by the server computer system, the first user device to a host checkout server, wherein redirecting includes transmitting the first product information to the host checkout server, and wherein the host checkout server generates the first checkout page for the first user device using the first product information. The method further comprises receiving, by the server computer system from a second user device, a second request message at a second network address, the second request message requesting a second checkout page that includes second product information of a second product. The method further comprises retrieving, by the server computer system, the second product information from the database that associates the second product information with the second network address. The method further comprises redirecting, by the server computer system, the second user device to the host checkout server, wherein redirecting includes transmitting the second product information to the host checkout server, and wherein the host checkout server generates the second checkout page for the second user device using the second product information.

Another embodiment of the invention is directed to a server computer system comprising a processor and memory coupled to the processor. The memory stores instructions, which when executed by the processor, cause the server computer system to perform operations including the steps of the above method.

These and other embodiments of the invention are described in further detail below.

TERMS

Figure 1:
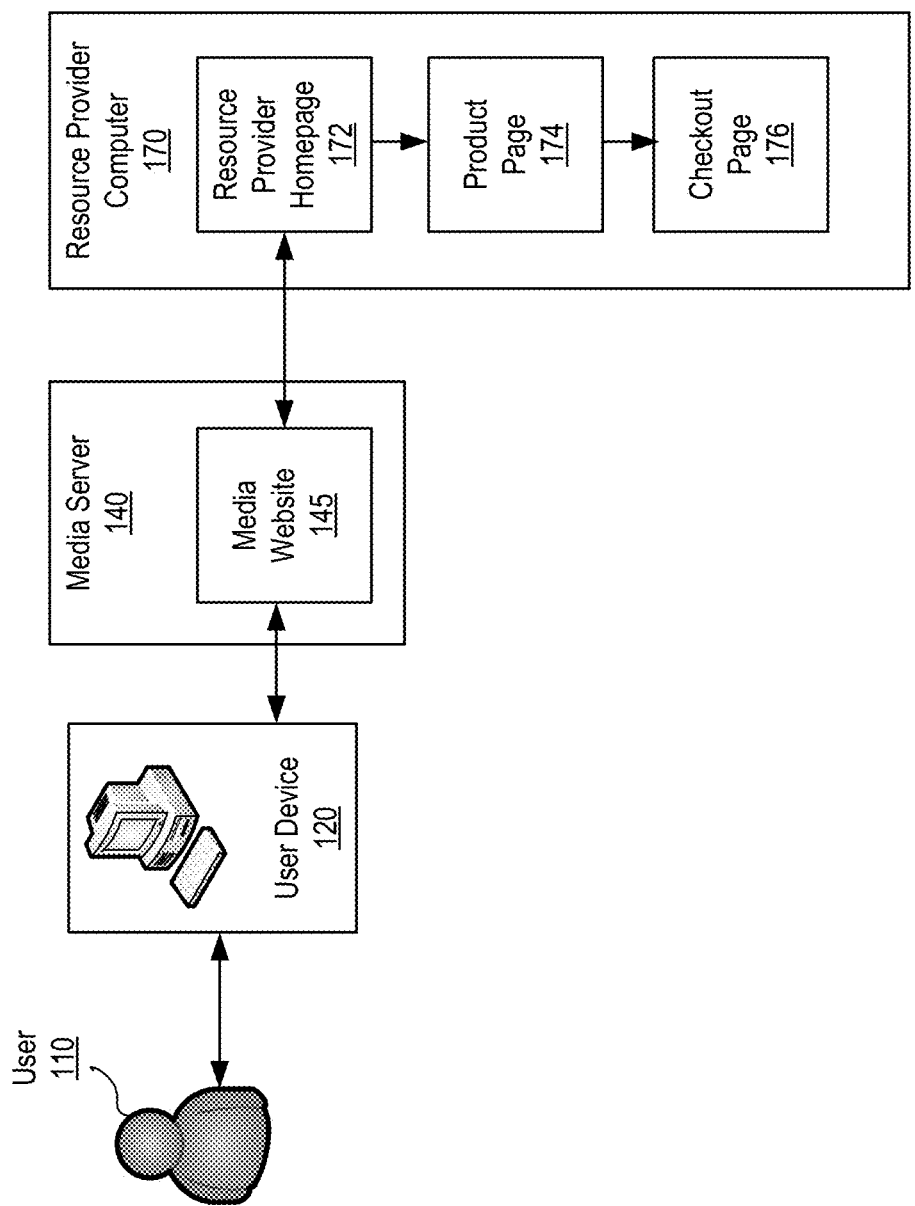
FIG. 1 shows a block diagram of a system for accessing checkout pages from social media according to an embodiment of the present invention.

Prior to discussing specific embodiments of the invention, some terms may be described in detail.

A "checkout page" may include any website that allows a user to complete a transaction (e.g., a purchase of a product). The checkout page may include product name(s) and/or product information, and fields in which a user can enter any other information necessary to complete the transaction, such as a billing address, a shipping address, payment information, and the like.

A "host checkout server" may include any server computer system that is configured to host checkout pages. In one embodiment, the checkout pages may be generated by the host checkout server on the fly when receiving a request to checkout (e.g., submit for processing) a transaction for product(s).

A "media website" may include any website, platform or application that enables users to create content, share content and/or to participate in networking. The terms "media application", "media website", and "media platform" may be used interchangeably herein. Media websites may include social media websites, applications, and/or platforms. Exemplary media websites include blogs (such as LiveJournal™), news websites, Facebook™, Twitter™, Snapchat™, Instagram™, LinkedIn™, Google+™ YouTube™, Pinterest™, Tumblr™, and the like.

A "network address" may include any combination of letters, numbers and/or symbols identifying a website, a file, or a device on a network. Exemplary network addresses includes Internet Protocol (IP) addresses, media access control (MAC) addresses, host addresses, Uniform Resource Identifier (URI) addresses, and the like. A network address can include a port number.

A "product" may include any tangible or intangible item. For example, a product can include goods, services, data, information, and the like. In one embodiment, a product may be an item available for purchase.

"Product information" may include any information associated with a product. The information may be descriptive or characteristic of a product. In one embodiment, the information may be unique or identifying of a product. Exemplary product information includes name, type (e.g., goods, services, data, etc.), description, color, price, size, stock keeping unit (SKU), and the like. In one embodiment, product information includes any combination of letters, numbers, symbols and/or graphics identifying a product.

A "request message" may include any communication from one party or entity requesting anything from another party or entity. The request may be, for example, for information, data, goods, services, and the like, in any suitable form. Further, the request message may be transmitted by any suitable method such as, for example, over a network.

A "server computer system" may include a computer or cluster of computers. For example, the server computer system can be a large mainframe, a minicomputer cluster, or a group of servers functioning as a unit. In one example, the server computer system may be a database server coupled to a Web server. The server computer system may be coupled to a database and may include any hardware, software, other logic, or combination of the preceding for servicing the requests from one or more client computers. The server computer system may comprise one or more computational apparatuses and may use any of a variety of computing structures, arrangements, and compilations for servicing the requests from one or more client computers.

A "user device" may comprise any suitable electronic device that may be operated by a user, such as a computer. In some embodiments, the user device may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include mobile devices (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A user device may comprise any suitable hardware and software for performing such functions, and may also include multiple devices or components (e.g., when a device has remote access to a network by tethering to another device—i.e., using the other device as a modem—both devices taken together may be considered a single user device).

DETAILED DESCRIPTION

Embodiments of the present invention are directed to systems and methods for generating, receiving, and processing product-specific network addresses that may be used to generate product-specific checkout pages. In some embodiments, an intermediary server includes product-specific network addresses for merchants to be used on media websites. The product-specific network addresses may be generated or assigned in response to the merchant using a plugin that is integrated into the merchant's browser. The product-specific network address can be stored by the intermediary server in association with particular product information, where the intermediary server can add the particular product information into a request to a checkout server.

The intermediary server can act as an interface between a user device that is directed to the product-specific network address (e.g., by clicking a link on the media website) and a host checkout server. Specifically, the intermediary server can receive a communication at the product-specific network address, retrieve the associated product information based on the product-specific network address at which the communication was received, and forward the product information to the host checkout server. The host checkout server may then generate a checkout page for the user using the product information.

Embodiments of the present invention can therefore provide many advantages. For example, the merchant may quickly and easily generate a product-specific network address to share on social media applications. No product information is required to accompany a user's checkout request when the user device is directed to the network address, as is conventionally required to generate product-specific checkout pages. Thus, the checkout page may be seamlessly integrated into social media applications that require links to be valid and not send information to an external server. Further, because the intermediary server stores the product information in association with the product-specific network address, accurate product information may be used to generate summaries that often accompany the links on the media website.

I. Checkout Pages

Checkout pages are websites that allow a user to complete a transaction (e.g., a purchase of a product). The checkout page may include product name(s) and/or product information, and fields in which a user can enter any other information necessary to complete the transaction, such as a billing address, a shipping address, payment information, and the like. Checkout pages are conventionally difficult to link to from media websites because they require additional information outside of the network address, such a product information, to be sent to an external server. Many media websites do not allow such additional information to be sent invisible to the user. However, the external server requires the product information in order to generate a proper checkout page for the product from a link not part of a full service merchant website. Thus, checkout pages cannot be conventionally linked to on media websites. A user could enter the proper information into a blank checkout page, but this may lead to errors in data entry and force the specific product information to be provided to the user.

FIG. 1 illustrates a block diagram of a conventional system for accessing checkout pages from social media according to an embodiment of the present invention. FIG. 1 illustrates a user device 120 being used by a user 110. The user 110 uses user device 120 to access a media website 145, such as over a network. The media website 145 may be hosted by media server 140, which may be a server computer system.

While visiting the media website 145, the user 110 may see a product that the user 110 wishes to purchase. However, product-specific checkout pages cannot be conventionally linked to on media website 145 due to restrictions in transmitting invisible product information to an external server. Thus, the user 110 may instead click on a link that simply directs user device 120 to a resource provider homepage 172 on resource provider computer 170. Resource provider computer 170 may be associated with the resource provider (e.g., merchant) that sells the product of interest.

Once on resource provider homepage 172, user 110 may browse the website to locate product page 174, or search resource provider homepage 172 for the product of interest to locate product page 174. Once on product page 174, user 110 may add the product of interest to his or her shopping cart, and/or select a link that allows user 110 to checkout and purchase the product on checkout page 176. Thus, in these conventional systems, user 110 has to make at least three selections to generate a product-specific checkout page: (1) selection of a link to the resource provider homepage 172 from media website 145, (2) selection of a link to the product page 174 from the resource provider homepage 172, and (3) selection of a link to checkout page 176 from the product page 174. This unnecessarily costs extra time, effort and processing by user 110 and resource provider computer 170, and may deter user 110 from making the purchase. Further, a resource provider is forced to maintain a general e-commerce website, which is expensive.

II. Use of Product-Specific Network Addresses at Intermediary Server

Embodiments of the present invention use product-specific network addresses to route user requests for a product-specific checkout page to an intermediary server. The intermediary server can add product information to the request and forward it to a host checkout server that generates the product-specific checkout page. This reduces the time and effort needed by a user to purchase a product from a link on a media website.

Figure 2:
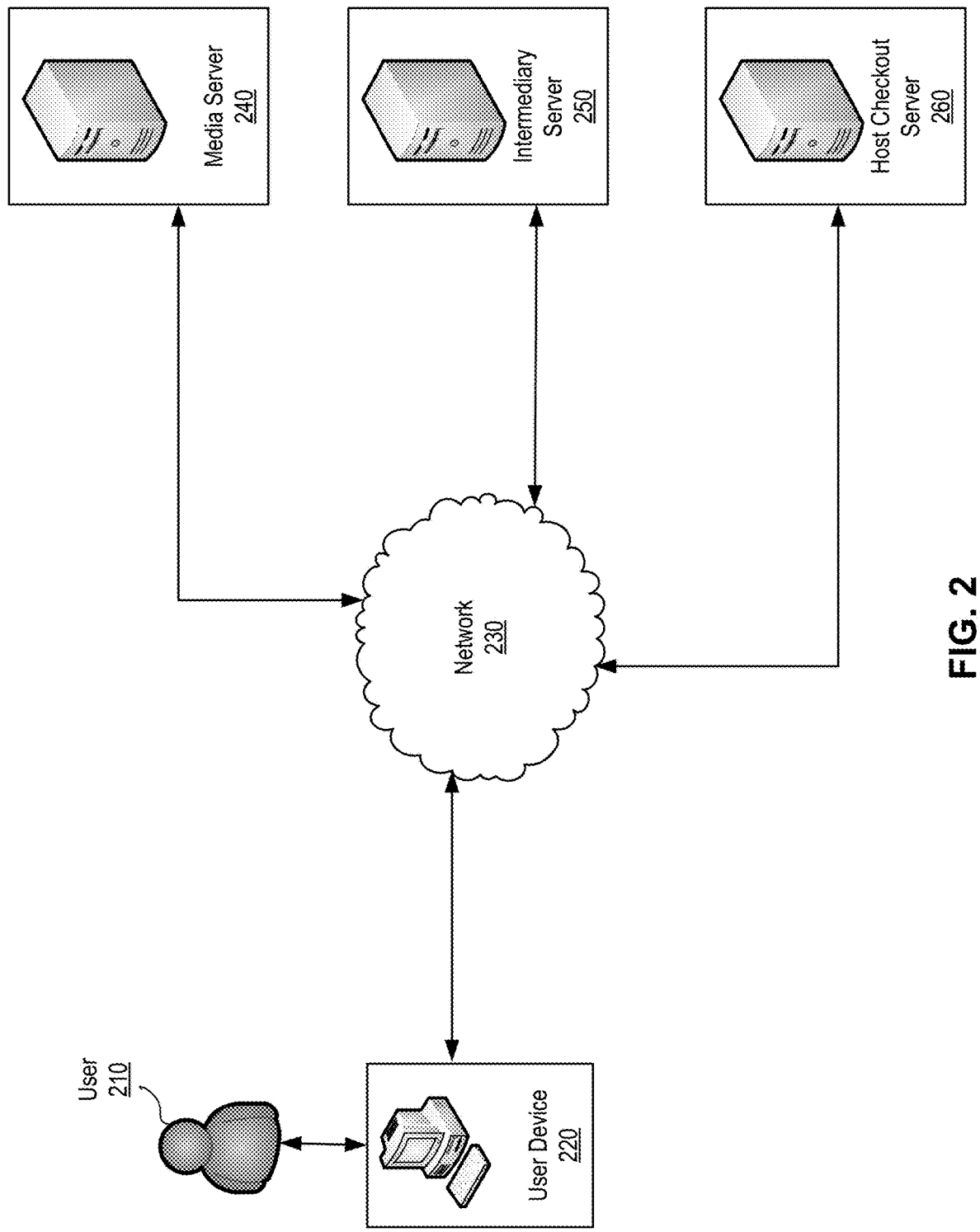
FIG. 2 shows a block diagram of a system for generating checkout pages from network addresses over a network according to an embodiment of the present invention.

FIG. 2 shows a block diagram of a system for generating checkout pages from network addresses over a network 230 according to an embodiment of the present invention. FIG. 2 illustrates a user device 220 being used by a user 210. The user 210 uses user device 220 to access a media website, such as over the network 230. The media website may be hosted by a media server 240, which may be a server computer system.

Network 230 may be any types of network, including a private or public network. A private network may include networks for a large site, such as a corporate office, a university campus, a hospital, a government office, or a similar entity. Network 230 may also be found at small sites, such as in a private home. A public network may include the Internet. Network 230 may include third-party telecommunication lines, such as phone lines, broadcast coaxial cable, fiber optic cables, satellite communications, cellular communications, and the like.

While visiting the media website, the user 210 may see a product that the user 110 wishes to purchase. The user 110 may click on a link having a product-specific network address posted on the media website. The link may be described as a request for a checkout page associated with the product. The product-specific network address may redirect user device 220 to an intermediary server 250 over network 230. The intermediary server 250 may use the product-specific network address to retrieve product information from a database, which may be local to intermediary server 250.

The intermediary server 250 may then transmit the product information to a host checkout server 260 over network 230. The intermediary server 250 may further redirect the user device 220 to the host checkout server 260 over network 230. The host checkout server 260 may then generate a checkout page for the product using the product information that is displayed on user device 220.

Thus, in embodiments of the invention, user 210 has to make only one selection to generate a product-specific checkout page: (1) selection of a link associated with a product-specific network address. The intermediary server 250 and host checkout server 260 can perform the steps necessary to generate a product-specific checkout page without further input from the user 210. This reduces the amount of time and effort needed by user 210 to make the purchase, encouraging sales and increasing revenue, along with enabling use of a checkout server that can handle various products at a single network address.

A. Generating Product-Specific Network Addresses

Embodiments of the invention may be used by resource providers (e.g., merchants) to quickly and conveniently generate product-specific network addresses that are compatible with media websites.

Figure 3A:
FIGS. 3A and 3B show user interfaces for generating network addresses for product-specific checkout pages according to an embodiment of the present invention.
Figure 3B:
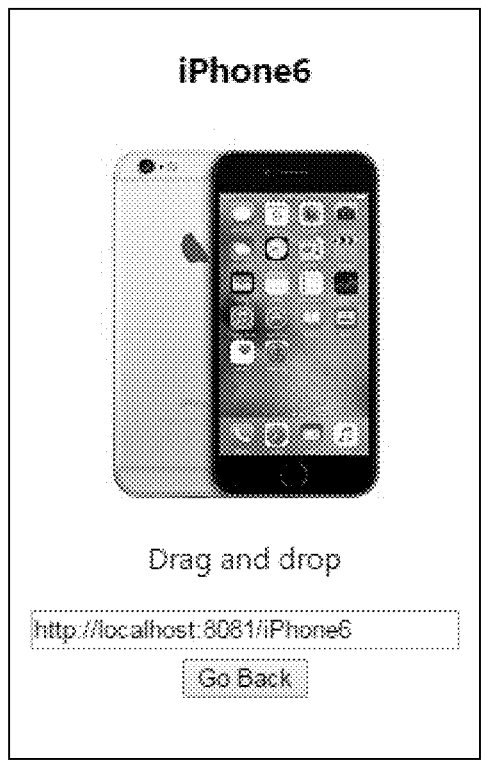

FIGS. 3A and 3B show merchant interfaces for generating network addresses for product-specific checkout pages according to an embodiment of the present invention. FIG. 3A illustrates a merchant portal for generating product-specific network addresses. The merchant portal displays products available for sale by the merchant; in this case, the merchant portal displays a plurality of cell phones available for sale by the merchant. The merchant portal may be an application or widget that is integrated into the merchant's web browser. To generate a product-specific network address, the merchant may simply select the product for which the network address is to be generated. The merchant portal in FIG. 3A may be displayed when a user logs onto the intermediate server, e.g., using the application or widget that is integrated into the merchant's web browser.

Upon selection of a product, a product-specific network address is generated. FIG. 3B illustrates a product-specific merchant portal page displaying the product name (e.g., "iPhone 6"), a picture of the product, and the product-specific network address (e.g., "http://localhost:8081/iPhone6"). On the backend, an intermediary server stores the network address (e.g., "http://localhost:8081/iPhone6") or a portion thereof (e.g., "iPhone6") in association with product information (e.g., the name of the product) in a database. The merchant can then post the product-specific network address to any media website to allow a user to access a product-specific checkout page.

Once selected, the product-specific network address directs a user to the intermediary server, which retrieves or otherwise obtains the product information corresponding to the network address, e.g., from a database where a database record is created or updated when the product-specific network address is generated by the merchant. The intermediary server then provides the product information to a host checkout server and redirects the user to the host checkout server. The host checkout server generates a product-specific checkout page using the product information.

Because the network address is stored in association with the product information by the intermediary server, no product information is required to be sent to the intermediary server when the user enters the network address, which is conventionally required to generate product-specific checkout pages. Thus, the checkout page may be seamlessly integrated into media websites that prohibit links that send information to an external server. Further, because the intermediary server stores the product information with the product-specific network address, accurate product information may be used to generate a summary of the link by the media website, which may automatically pull the product information from the intermediary server.

B. Processing Product-Specific Network Addresses

Embodiments of the invention may further be used to process received product-specific network addresses from users redirected by media websites.

Figure 4:
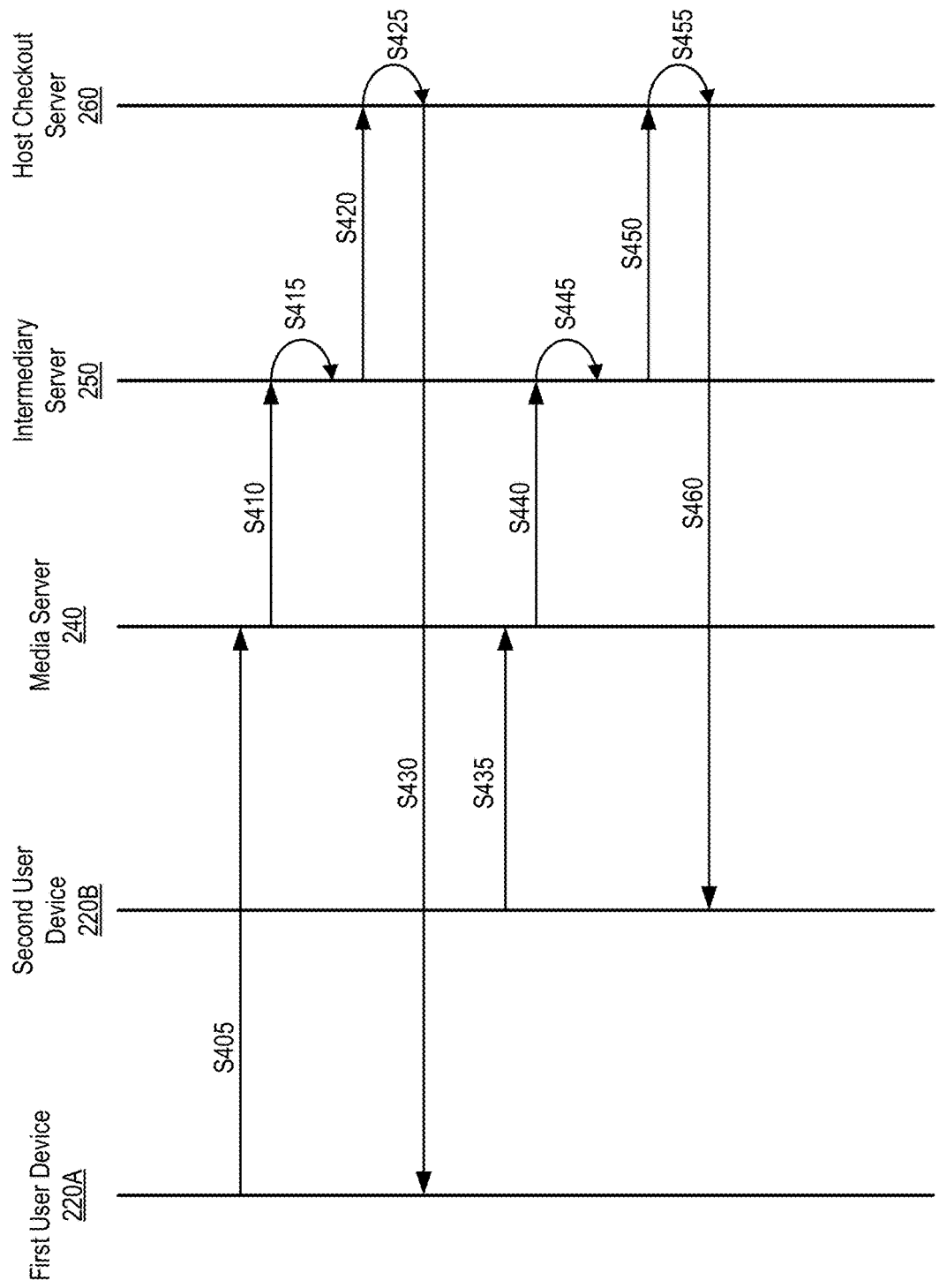
FIG. 4 shows a flow diagram for processing network addresses to provide access to product-specific checkout pages according to an embodiment of the invention.

FIG. 4 illustrates a flow diagram for processing network addresses to provide access to product-specific checkout pages according to an embodiment of the invention. At step S405, a first user device 220A visits a media website hosted by media server 240. First user device 220A may be user device 220 of FIG. 2, for example.

At step S410, first user device 220A selects a link to purchase a product. The link is associated with a product-specific network address. The link directs first user device 220A to intermediary server 250.

At step S415, the intermediary server 250 retrieves product information associated with the product-specific network address. In one embodiment, the intermediary server 250 may extract some or all of the product information from the product-specific network address, such as extracting "iPhone6" from "http://localhost:8081/iPhone6". Other product information (e.g., price) can also be included in the product-specific network address. In another embodiment, the intermediary server 250 may retrieve the product information from a look-up table, where it is stored in association with some or all of the network address. For example, the network address may be "http://localhost:8081/cd834de". The portion of the network address, "cd834de", may be stored in association with the product information "iPhone6" in a look-up table. Thus, "cd834de" may be used to obtain the product information "iPhone6". In another example, the entire network address, "http://localhost:8081/cd834de", may be stored in association with the product information "iPhone6".

At step S420, the intermediary server 250 redirects the first user device 220A to the host checkout server 260. The intermediary server 250 concurrently transmits the obtained product information to the host checkout server 260.

At step S425, the host checkout server 260 generates a checkout page for the product requested by first user device 220A at step S410. The host checkout server 260 generates the checkout page using the product information received from the intermediary server 250.

At step S430, the host checkout server 260 displays the checkout page to the first user device 220A. The checkout page may include the product information, such as the product name, a product description, a price, etc. The checkout page may further include fields to be filled in by a user associated with first user device 220A, such as billing address, shipping address, payment information, and the like.

At step S435, a second user device 220B visits a media website hosted by media server 240. Although shown and described as being the same media server 240, it is contemplated that in other embodiments, the second user device 220B may visit a different media website hosted by a different media server than first user device 220A. Second user device 220B may be user device 220 of FIG. 2, for example.

At step S440, second user device 220B selects a link to purchase a product. The product may be the same or different than the product requested by first user device 220A. The link is associated with a product-specific network address. The link directs second user device 220B to intermediary server 250.

At step S445, the intermediary server 250 retrieves product information associated with the product-specific network address. This step may be performed similarly as that described above with respect to step S415.

At step S450, the intermediary server 250 redirects the second user device 220B to the host checkout server 260. Host checkout server 260 may be the same host checkout server to which both the first user device 220A and the second user device 220B are redirected. The intermediary server 250 concurrently transmits the obtained product information to the host checkout server 260.

At step S455, the host checkout server 260 generates a checkout page for the product requested by second user device 220B at step S435. The host checkout server 260 generates the checkout page using the product information received from the intermediary server 250. The checkout page for the first user device 220A and the checkout page for the second user device 220B may have the same network address (e.g., URL), because they are generated by the same host checkout server 260, and because the product information is transmitted separately than the network address from the intermediary server 250. In other words, the host checkout server 260 does not need to extract and/or retrieve the product information from the network address provided to it by the intermediary server 250, as the intermediary server 250 does with the user devices 220A-B.

At step S460, the host checkout server 260 displays the checkout page to the second user device 220B. The checkout page may be as described above with respect to step S430, for the same or a different product.

Figure 5:
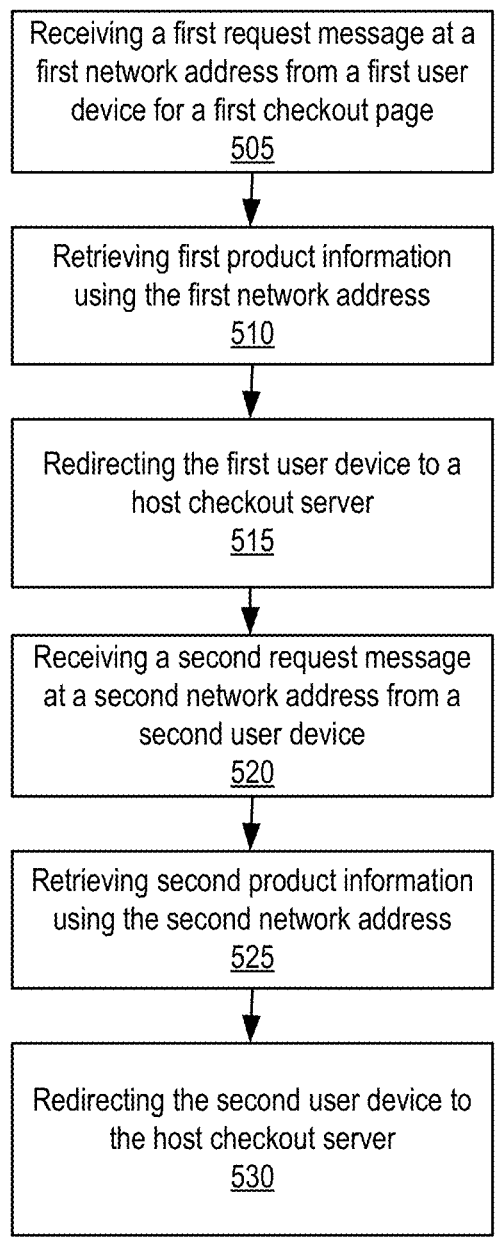
FIG. 5 shows another flow diagram for processing network addresses to provide access to product-specific checkout pages according to an embodiment of the invention.

FIG. 5 shows another flow diagram for processing network addresses to provide access to product-specific checkout pages according to an embodiment of the invention. FIG. 5 is drawn to the perspective of the intermediary server, such as intermediary server 250 of FIG. 2, in one embodiment.

At step 505, a first request message at a first network address is received from a first user device. The first request message requests a first checkout page that includes first product information of a first product.

At step 510, the first product information is retrieved from a database that associates the first product information with the first network address. For example, the network address may be "http://localhost:8081/cd834de". The network address, "http://localhost:8081/cd834de", may be stored in association with the product information "iPhone6". Thus, the network address may be used to obtain the product information.

At step 515, the first user device may be redirected to a host checkout server. Step 515 may further include transmitting the first product information to the host checkout server. The host checkout server may thereafter generate the first checkout page for the first user device using the first product information.

At any point after step 515, the first user device may request that a transaction for the first product be processed via the first checkout page. For example, the first user device may provide information to the host checkout server that allows the user associated with the first user device to purchase the first product, such as a shipping address, a billing address, payment information, etc. The transaction may then be processed as described further herein with respect to FIG. 8, for example.

At step 520, a second request message at a second network address is received from a second user device. The second request message requests a second checkout page that includes second product information of a second product. The second product may be the same or different as the first product. Further, the first and second products may be sold by the same or different resource providers (e.g., merchants).

At step 525, the second product information is retrieved from a database that associates the second product information with the second network address. For example, the network address may be "http://localhost:8081/123456". The network address, "http://localhost:8081/123456", may be stored in association with the product information "Nexus6". Thus, the network address may be used to obtain the product information.

At step 530, the second user device may be redirected to a host checkout server. Step 530 may further include transmitting the second product information to the host checkout server. The host checkout server may thereafter generate the second checkout page for the second user device using the second product information. The second checkout page may be the same or different as the first checkout page. For example, if the first product is the same as the second product, the first and second checkout pages may be the same. Regardless of whether the first and second checkout pages are the same, the first and second checkout pages may be associated with the same network address.

At any point after step 530, the second user device may request that a transaction for the second product be processed via the second checkout page. For example, the second user device may provide information to the host checkout server that allows the user associated with the second user device to purchase the second product, such as a shipping address, a billing address, payment information, etc. The transaction may then be processed as described further herein with respect to FIG. 8, for example.

III. Example Systems

Various systems may be used to implement the methods described above. Examples of an intermediary server and a host checkout server are now described.

Figure 6:
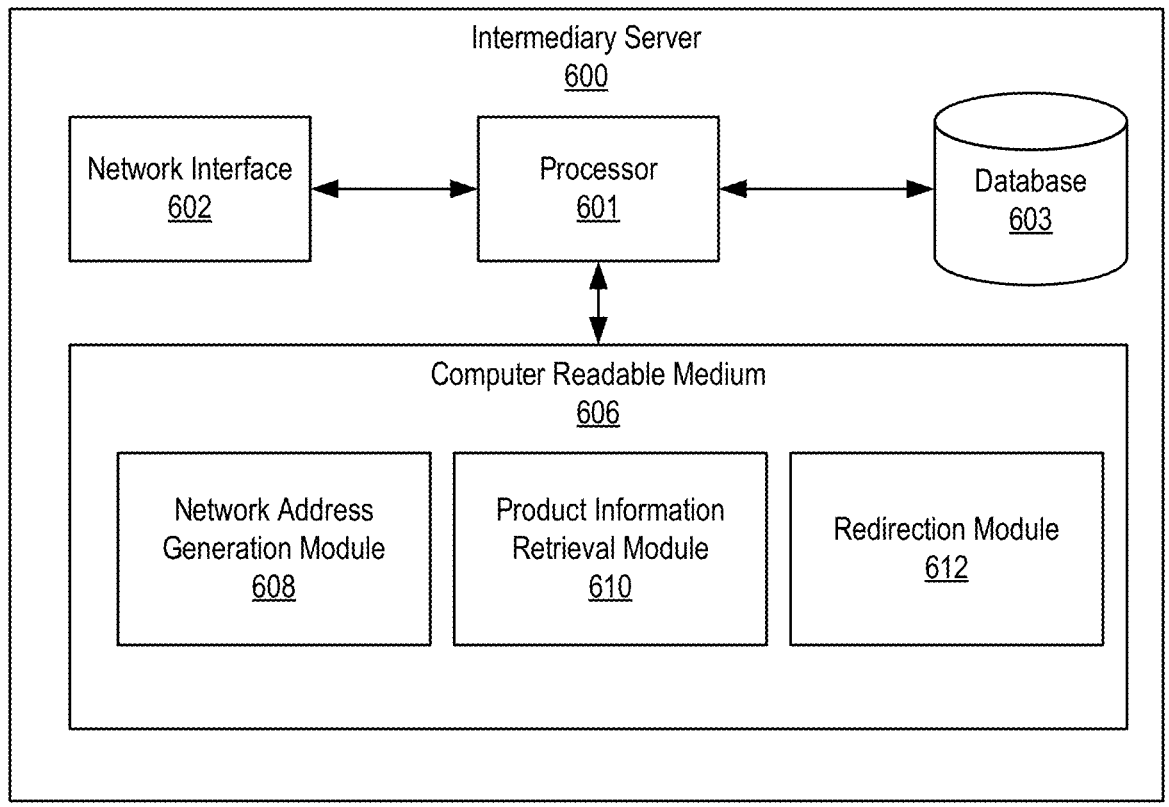
FIG. 6 shows a block diagram of an intermediary server for processing specific network addresses according to an embodiment of the invention.

FIG. 6 shows a block diagram of an intermediary server 600 for processing product-specific network addresses according to an embodiment of the invention. Intermediary server 600 may implement any of the methods described herein. Intermediary server 600 may include a processor 601 coupled to a network interface 602 and a computer readable medium 606. Intermediary server 600 may also include or otherwise have access to a database 603 that may be internal or external to intermediary server 600. Database 603 may, for example, store a look-up table with associations between product-specific network addresses and product information.

Processor 601 may include one or more microprocessors to execute program components for performing the functions of intermediary server 600. Network interface 602 can be configured to connect to one or more communication networks to allow intermediary server 600 to communicate with other entities, such as host checkout server 700 of FIG. 7. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 implementing a network address generation module 608, a product information retrieval module 610, and a redirection module 612. Although shown and described as having each of these modules, it is contemplated that more or fewer modules may be implemented within computer readable medium 606. For example, a network address generation module 608, a product information retrieval module 610, and/or a redirection module 612 may not be implemented in all embodiments.

Network address generation module 608 may, in conjunction with processor 601, generate product-specific network addresses for products. For example, network address generation module 608 may receive a request from a resource provider (e.g., a merchant) to generate a product-specific network address. The request may include product information for the requested product (e.g., a product name, description and/or any other identifier). Network address generation module 608 may, in conjunction with processor 601, store the product information in association with the generated product-specific network address in the database 603.

Product information retrieval module 610 may, in conjunction with processor 601, retrieve product information from database 603 in one embodiment. For example, product information retrieval module 610 may receive a product-specific network address from a user device. Product information retrieval module 610 may then, in conjunction with processor 601, locate and retrieve the product information stored in association with the product-specific network address.

In another embodiment, product information retrieval module 610 may, in conjunction with processor 601, extract product information from a product-specific network address. For example, product information retrieval module 610 may receive a product-specific network address from a user device. The product-specific network address may include the product information (e.g., "iPhone6" in "http://localhost:8081/iPhone6"). Thus, in this example, product information retrieval module 610 may, in conjunction with processor 601, extract "iPhone6" from the product-specific network address.

Figure 7:
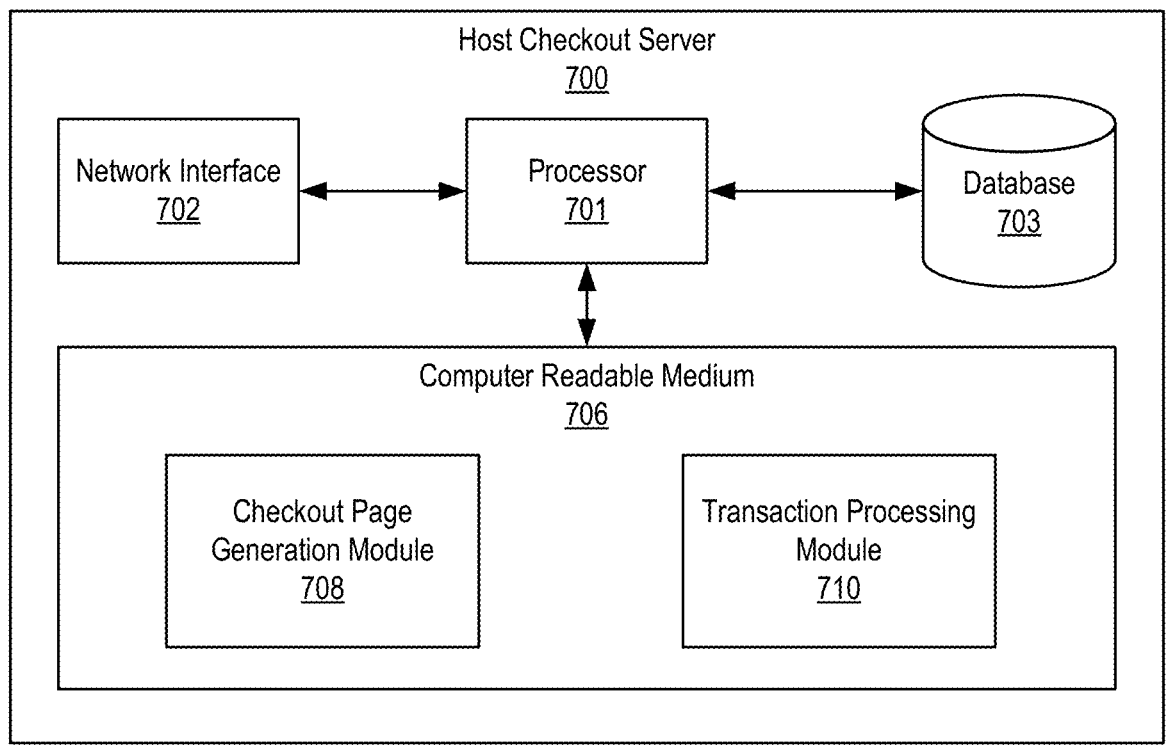
FIG. 7 shows a block diagram of a host checkout server for generating checkout pages and initiating transaction processing according to an embodiment of the invention.

Redirection module 612 may, in conjunction with processor 601, redirect user devices to a host checkout server, such as host checkout server 700 of FIG. 7. For example, redirection module 612 may receive product information from the product information retrieval module 610, and send the product information to the host checkout server. Redirection module 612 may, in conjunction with processor 601, redirect a user device to the host checkout server while concurrently sending the product information.

FIG. 7 shows a block diagram of a host checkout server 700 for generating checkout pages and initiating transaction processing according to an embodiment of the invention. Host checkout server 700 may implement host checkout server 260 of FIG. 2, for example. Host checkout server 700 may include a processor 701 coupled to a network interface 702 and a computer readable medium 706. Host checkout server 700 may also include or otherwise have access to a database 703 that may be internal or external to host checkout server 700.

Processor 701 may include one or more microprocessors to execute program components for performing the functions of host checkout server 700. Network interface 702 can be configured to connect to one or more communication networks to allow host checkout server 700 to communicate with other entities, such as intermediary server 600 of FIG. 6. Computer readable medium 706 may include any combination of one or more volatile and/or non-volatile memories, for example, RAM, DRAM, SRAM, ROM, flash, or any other suitable memory components. Computer readable medium 606 may store code executable by the processor 701 implementing a checkout page generation module 708 and a transaction processing module 710. Although shown and described as having each of these modules, it is contemplated that more or fewer modules may be implemented within computer readable medium 706. For example, a checkout page generation module 708 and/or a transaction processing module 710 may not be implemented in all embodiments.

Checkout page generation module 708 may, in conjunction with processor 701, generate checkout pages based on product information received from an intermediary server. Checkout page generation module 708 may receive a request to generate a checkout page for a user device along with product information. Checkout page generation module 708, in conjunction with processor 701, builds and presents a checkout page for a product using the product information. The checkout page may be associated with a single network address that is not product-specific. This may be because the product information is sent separately than the network address, and thus does not have to be transmitted within or identified by the network address. The checkout page may include some or all of the product information and may include fields to be filled out by a user in order to purchase the product, such as shipping address, billing address, payment information, and the like.

Transaction processing module 710 may, in conjunction with processor 701, initiate transaction processing for a user of a user device wishing to purchase a product. For example, transaction processing module 710 may receive transaction information from a user device. The transaction information may have been submitted by the user device via the checkout page generated by checkout page generation module 708. The transaction information may include product information, address information, payment information, transaction time, and the like. Transaction processing module 710 may, in conjunction with processor 701, determine a resource provider (e.g., merchant) offering the product for sale and forward the transaction information to the resource provider. The transaction may be processed as described herein with respect to FIG. 8.

IV. Transaction Processing

Figure 8:
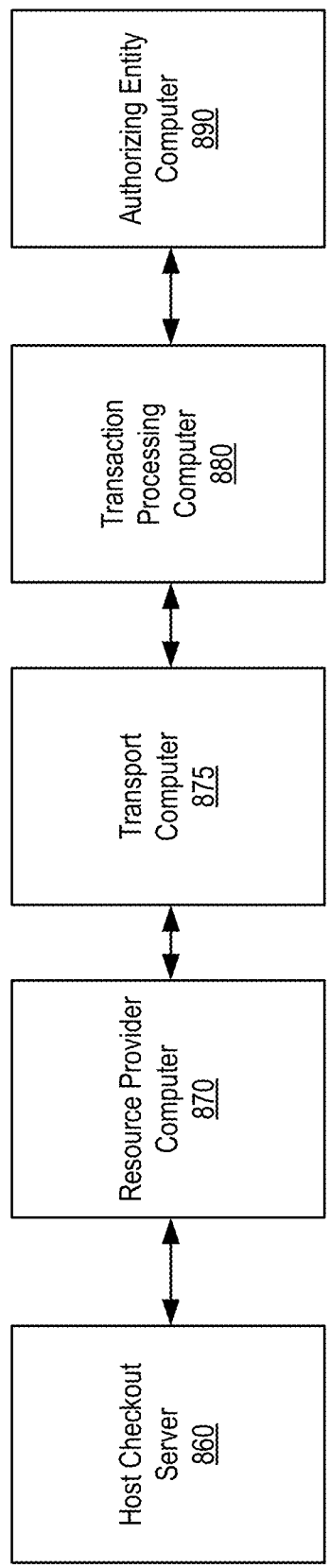
FIG. 8 shows a block diagram of a system for processing a transaction initiated from a checkout page according to an embodiment of the present invention.

Embodiments of the present invention may be used to generate product-specific checkout pages. The product-specific checkout pages may be used to initiate transactions to purchase products by user devices. FIG. 8 shows a block diagram of a system for processing a transaction initiated from a checkout page according to an embodiment of the present invention. The system includes a host checkout server 860, a resource provider computer 870, a transport computer 875, a transaction processing computer 880, and an authorizing entity computer 890. Each of these systems and computers may be in operative communication with each other. The host checkout server 860 may be the same or different as host checkout server 260 of FIG. 2 and/or host checkout server 700 of FIG. 7.

For simplicity of illustration, a certain number of components are shown in FIG. 8. It is understood, however, that embodiments of the invention may include more than one of each component. In addition, some embodiments of the invention may include fewer than or greater than all of the components shown in FIG. 8. In addition, the components in FIG. 8 may communicate via any suitable communication medium (including the Internet), using any suitable communications protocol.

Host checkout server 860 may initiate transaction processing for a user of a user device (not shown) wishing to purchase a product. For example, host checkout server 860 may receive transaction information from a user device. The transaction information may have been submitted by the user device via a checkout page generated by host checkout server 860. The transaction information may include product information, address information, payment information, transaction time, and the like. Host checkout server 860 may determine a resource provider (e.g., merchant) offering the product for sale and forward the transaction information to the resource provider computer 870 associated with the resource provider.

The resource provider computer 870 may be configured to receive transaction data from host checkout server 860 and generate authorization request messages. Resource provider computer 870 may enable a resource provider (e.g., merchant) to engage in transactions, sell goods or services, or provide access to goods or services to the consumer. The resource provider computer 870 may accept multiple forms of payment and may use multiple tools to conduct different types of transactions. For example, the resource provider computer 870 may enable the resource provider to sell goods and/or services via a website, and may accept payments over the Internet. The resource provider computer 870 may comprise a server computer system. The server computer system may include a processor and a computer readable medium coupled to the processor, the computer readable medium comprising code, executable by the processor.

The transport computer 875 is typically a system for an entity (e.g., a bank) that has a business relationship with a particular resource provider or other entity. The transport computer 875 may route the authorization request message for a transaction to the authorizing entity computer 890 via a transaction processing computer 880. The transport computer 875 may comprise a server computer system. The server computer system may include a processor and a computer readable medium coupled to the processor, the computer readable medium comprising code, executable by the processor.

The transaction processing computer 880 may be associated with one or more payment service providers. The transaction processing computer 880 may include any entity that provides provisioning or personalization services. For example, the transaction processing computer 880 may maintain a personalization database with user information, and the transaction processing computer 880 may be configured to communicate with authorizing entity computer 890 to determine personalized payment data for users. The transaction processing computer 880 may comprise a server computer system. The server computer system may include a processor and a computer readable medium coupled to the processor, the computer readable medium comprising code, executable by the processor.

The authorizing entity computer 890 is typically run by a business entity (e.g., a bank) that may have issued a payment device, account numbers or payment tokens used for the transactions. Some systems can perform both authorizing entity computer 890 and transport computer 875 functions. When a transaction involves a payment account associated with the authorizing entity computer 890, the authorizing entity computer 890 may verify the account and respond with an authorization response message to the transport computer 875, the results of which may be forwarded to the consumer. In some embodiments, authorizing entity computer 890 performs authentication of payment devices and/or consumers prior to authorizing a transaction. In other embodiments, authentication may be performed by the resource provider computer 870, the transport computer 875, and/or the transaction processing computer 880. The authorizing entity computer 890 may comprise a server computer system. The server computer system may include a processor and a computer readable medium coupled to the processor, the computer readable medium comprising code, executable by the processor.

At a later time after a transaction (e.g., at the end of the day), a clearing and settlement process can occur between the transport computer 875, the transaction processing computer 880, and the authorizing entity computer 890.

V. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An intermediate server computer system comprising:
   a processor; and
   a memory coupled to the processor, the memory storing instructions, which when executed by the processor, cause the intermediate server computer system to perform operations including:
   receiving, from a first media website that redirected a first user request from a first user device, a first checkout request for a first checkout page associated with a first product from a first merchant, wherein the first media website is hosted by a first media server, and wherein the first user request is received by the first media website upon a selection of a link having a first product specific network address that corresponds to the intermediate server computer system and that is associated with the first product posted on the first media website by the first user device;
   retrieving, using the first product specific network address, first product information from a database that associates the first product information with the first product specific network address;
   redirecting the first user device to a host checkout server, wherein redirecting includes transmitting the first product information to the host checkout server, and wherein the host checkout server generates the first checkout page for the first user device using the first product information;
   receiving, from a second media website that redirected a second user request from a second user device, a second checkout request at a second product specific network address that corresponds to the intermediate server computer system, the second checkout request requesting a second checkout page that includes second product information of a second product from a second merchant, wherein the second media website is hosted by a second media server, and wherein the first merchant and the second merchant are different and utilize the host checkout server;

retrieving, using the second product specific network address, the second product information from the database that associates the second product information with the second product specific network address; and redirecting the second user device to the host checkout server, wherein redirecting includes transmitting the second product information to the host checkout server, and wherein the host checkout server generates the second checkout page for the second user device using the second product information.

2. The intermediate server computer system of claim 1, wherein the first product is different than the second product.

3. The intermediate server computer system of claim 1, wherein the first checkout page is different than the second checkout page.

4. The intermediate server computer system of claim 1, wherein the redirecting of the first user device allows the host checkout server to receive a request to process a transaction for the first product from the first user device via the first checkout page.

5. The intermediate server computer system of claim 1, wherein the first user device and the second user device are redirected to a same network address of the host checkout server.

6. The intermediate server computer system of claim 1, wherein the operations further include:
generating the first product specific network address; and
storing the first product specific network address in association with the first product information in the database.

7. The intermediate server computer system of claim 1, wherein the operations further include:
receiving a request to display a plurality of products from a resource provider computer;
causing the plurality of products to be displayed on the resource provider computer, wherein the plurality of products includes the first product;
receiving, from the resource provider computer, a selection of the first product of the plurality of products;
generating the first product specific network address;
storing the first product specific network address in association with the first product information in the database; and
providing the first product specific network address to the resource provider computer, thereby allowing the resource provider computer to provide the first product specific network address for access by the first user device.

8. The intermediate server computer system of claim 1, wherein the first product is associated with a first resource provider, wherein the second product is associated with a second resource provider, and wherein the first resource provider is different than the second resource provider.

9. The intermediate server computer system of claim 1, wherein the first checkout request is received at the first product specific network address via a website.

10. A method comprising:
receiving, by an intermediate server computer system from a first media website that redirected a first user request from a first user device, a first checkout request for a first checkout page associated with a first product from a first merchant, wherein the first media website is hosted by a first media server, and wherein the first user request is received by the first media website upon a selection of a link having a first product specific network address that corresponds to the intermediate server computer system and that is associated with the first product posted on the first media website by the first user device;

retrieving, by the intermediate server computer system and using the first product specific network address, first product information from a database that associates the first product information with the first product specific network address;

redirecting, by the intermediate server computer system, the first user device to a host checkout server, wherein redirecting includes transmitting the first product information to the host checkout server, and wherein the host checkout server generates the first checkout page for the first user device using the first product information;

receiving, by the intermediate server computer system from a second media website that redirected a second user request from a second user device, a second checkout request at a second product specific network address that corresponds to the intermediate server computer system, the second checkout request requesting a second checkout page that includes second product information of a second product from a second merchant, wherein the second media website is hosted by a second media server, and wherein the first merchant and the second merchant are different and utilize the host checkout server;

retrieving, by the intermediate server computer system using the second product specific network address, the second product information from the database that associates the second product information with the second product specific network address; and redirecting, by the intermediate server computer system, the second user device to the host checkout server, wherein redirecting includes transmitting the second product information to the host checkout server, and wherein the host checkout server generates the second checkout page for the second user device using the second product information.

11. The method of claim 10, wherein the first product is different than the second product.

12. The method of claim 10, wherein the first checkout page is different than the second checkout page.

13. The method of claim 10, wherein the redirecting of the first user device allows the host checkout server to receive a request to process a transaction for the first product from the first user device via the first checkout page.

14. The method of claim 10, wherein the first user device and the second user device are redirected to a third network address.

15. The method of claim 10, further comprising:
generating, by the intermediate server computer system, the first product specific network address; and
storing, by the intermediate server computer system, the first product specific network address in association with the first product information in the database.

16. The method of claim 10, further comprising:
receiving, by the intermediate server computer system, a request to display a plurality of products from a resource provider computer;

causing, by the intermediate server computer system, the plurality of products to be displayed on the resource provider computer, wherein the plurality of products includes the first product;

receiving, by the intermediate server computer system, a selection of the first product of the plurality of products from the resource provider computer;

generating, by the intermediate server computer system, the first product specific network address;

storing, by the intermediate server computer system, the first product specific network address in association with the first product information in the database; and providing, by the intermediate server computer system, the first product specific network address to the resource provider computer.

17. The method of claim 10, wherein the first product is associated with a first resource provider, wherein the second product is associated with a second resource provider, and wherein the first resource provider is different than the second resource provider.

18. The method of claim 10, wherein the first checkout request is received at the first product specific network address via a website.

19. A non-transitory computer readable medium storing instructions which, when executed by a processor of an intermediate server computer system, cause the processor to perform operations comprising:

receiving, from a first media website that redirected a first user request from a first user device, a first checkout request for a first checkout page associated with a first product from a first merchant, wherein the first media website is hosted by a first media server, and wherein the first user request is received by the first media website upon a selection of a link having a first product specific network address that corresponds to the intermediate server computer system and that is associated with the first product posted on the first media website by the first user device;

retrieving, using the first product specific network address, first product information from a database that associates the first product information with the first product specific network address;

redirecting the first user device to a host checkout server, wherein redirecting includes transmitting the first product information to the host checkout server, and wherein the host checkout server generates the first checkout page for the first user device using the first product information;

receiving, from a second media website that redirected a second user request from a second user device, a second checkout request at a second product specific network address that corresponds to the intermediate server computer system, the second checkout request requesting a second checkout page that includes second product information of a second product from a second merchant, wherein the second media website is hosted by a second media server, and wherein the first merchant and the second merchant are different and utilize the host checkout server;

retrieving, using the second product specific network address, the second product information from the database that associates the second product information with the second product specific network address; and redirecting the second user device to the host checkout server, wherein redirecting includes transmitting the second product information to the host checkout server, and wherein the host checkout server generates the second checkout page for the second user device using the second product information.

20. The intermediate server computer system of claim 1, further comprising:

transmitting, to the first media website, a summary of the first product information for display by the first media website, wherein the summary of the first product information is provided after selection of the link.

21. The intermediate server computer system of claim 1, wherein the host checkout server is further enabled to initiate transaction processing for a first user of the first user device to purchase the first product, and wherein the intermediate server computer system is not enabled to initiate the transaction processing for the first user of the first user device.

* * * * *